United States Patent
Taylor et al.

(10) Patent No.: US 8,320,376 B2
(45) Date of Patent: Nov. 27, 2012

(54) METHOD AND SYSTEM FOR OUT-OF-BAND MESSAGING

(75) Inventors: Kevin N. Taylor, Parker, CO (US); Doug Jones, Boulder, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 771 days.

(21) Appl. No.: 10/570,831

(22) PCT Filed: Sep. 7, 2004

(86) PCT No.: PCT/US2004/028908
§ 371 (c)(1),
(2), (4) Date: Feb. 5, 2007

(87) PCT Pub. No.: WO2005/025114
PCT Pub. Date: Mar. 17, 2005

(65) Prior Publication Data
US 2007/0274345 A1    Nov. 29, 2007

Related U.S. Application Data

(60) Provisional application No. 60/501,231, filed on Sep. 5, 2003.

(51) Int. Cl.
*H04L 12/56* (2006.01)
(52) U.S. Cl. ........................................ 370/392
(58) Field of Classification Search .............. None
See application file for complete search history.

(56) References Cited

U.S. PATENT DOCUMENTS

| | | | |
|---|---|---|---|
| 5,745,837 A | 4/1998 | Fuhrmann | |
| 6,674,749 B1 | 1/2004 | Mattathil | |
| 6,853,680 B1 | 2/2005 | Nikolich | |
| 6,952,836 B1 | 10/2005 | Donlan et al. | |
| 6,988,130 B2 | 1/2006 | Blumenau et al. | |
| 7,194,756 B2 | 3/2007 | Addington | |
| 7,287,257 B2 | 10/2007 | Meza | |
| 7,324,515 B1 * | 1/2008 | Chapman | 370/392 |
| 7,349,430 B1 * | 3/2008 | Chapman | 370/468 |
| 7,359,434 B2 * | 4/2008 | Shahar et al. | 375/222 |
| 2001/0033585 A1 | 10/2001 | Lazarus et al. | |
| 2002/0001316 A1 | 1/2002 | Hornsby et al. | |
| 2002/0012353 A1 | 1/2002 | Gerszberg et al. | |
| 2002/0019984 A1 | 2/2002 | Rakib | |
| 2002/0067725 A1 | 6/2002 | Oguchi et al. | |
| 2002/0071440 A1 | 6/2002 | Cerami | |
| 2002/0143565 A1 | 10/2002 | Headings | |
| 2002/0191635 A1 | 12/2002 | Chow et al. | |

(Continued)

OTHER PUBLICATIONS

International Search Report for corresponding International Application No. PCT/US04/28908, 1 page, Aug. 26, 2005.

(Continued)

*Primary Examiner* — Yong Zhou
(74) *Attorney, Agent, or Firm* — Banner & Witcoff, Ltd.

(57) ABSTRACT

Method and system for Out-Of-Band (OOB) massaging with Customer Premises Equipment (CPE) configured to receive OOB messaging signals from a Cable Modem Termination System (CMTS). The method and system include determining whether a DCD message identifying data tunnels includes a DCD message identifier matching with a CPE identifier such that the data tunnels identified in the matching DCD message are tuned to by the CPE.

32 Claims, 3 Drawing Sheets

U.S. PATENT DOCUMENTS

| | | |
|---|---|---|
| 2003/0048380 A1 | 3/2003 | Tamura |
| 2003/0120819 A1 | 6/2003 | Abramson et al. |
| 2003/0200548 A1 | 10/2003 | Baran et al. |
| 2004/0030804 A1 | 2/2004 | Wiget et al. |
| 2004/0088737 A1 | 5/2004 | Donlan et al. |
| 2004/0141759 A1 | 7/2004 | Stiscia et al. |
| 2004/0261126 A1 | 12/2004 | Addington |
| 2005/0177861 A1 | 8/2005 | Ma et al. |
| 2005/0228877 A1 | 10/2005 | Monitzer |
| 2008/0010300 A1 | 1/2008 | Bunn et al. |

OTHER PUBLICATIONS

International Search Report for related International Application No. PCT/USO4/28909, Apr. 11, 2005, 1 page.

Final Rejection mailed from USPTO Dec. 6, 2011 for U.S. Appl. No. 12/970,364.

Office Action from Canadian Application No. 2,536,177, mailed Nov. 18, 2011.

\* cited by examiner

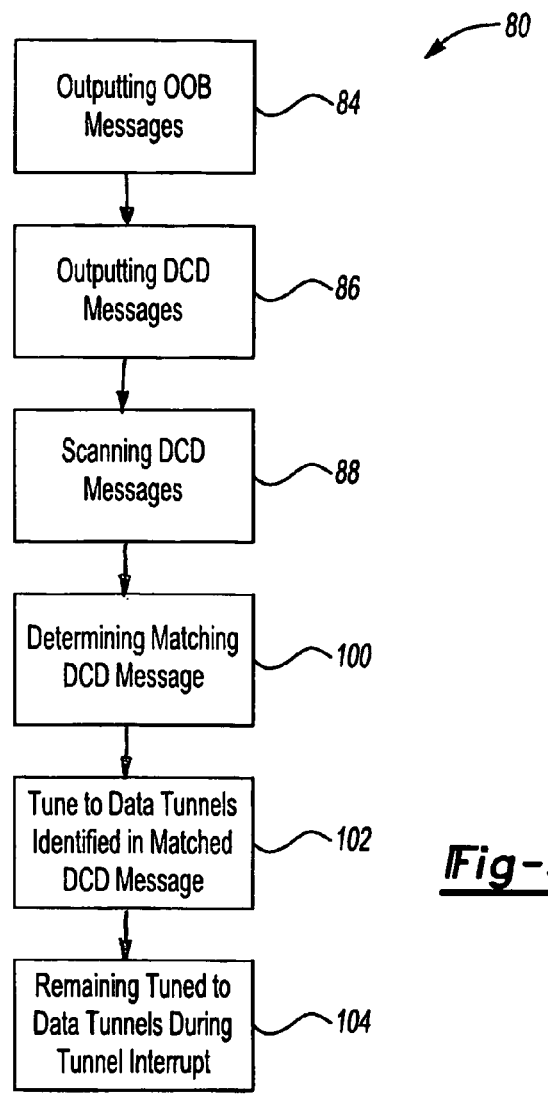

METHOD AND SYSTEM FOR OUT-OF-BAND MESSAGING

CROSS-REFERENCE TO RELATED APPLICATIONS

This application claims priority to PCT application Serial No. PCT/US2004/028908 filed Sep. 7, 2004, which claims the benefit of U.S. provisional application Ser. No. 60/501,231 filed Sep. 5, 2003.

BACKGROUND OF THE INVENTION

1. Field of the Invention

The present invention relates to Customer Premises Equipment (CPE) for operation with a Cable Modem Termination System (CMTS) of a cable system.

2. Background Art

Customer Premises Equipment (CPE) generally refer to items at a subscriber station that are configured to receiving cable signals, including video and control signals, from a cable service provider. The control signals, which are typically transmitted as Out-Of-Band (OOB) signals, are transferred from a management network to the subscriber station through a Cable Modem Termination System (CMTS) of a cable network. The CPE converts the OOB signals to control, application, and configuration signals for providing cable services to a subscriber station.

A need exists for a method and system for OOB messaging between CPE and a CMTS.

SUMMARY OF THE INVENTION

One aspect of the present invention relates to Customer Premises Equipment (CPE) for operation with a Cable Modem Termination System (CMTS) configured to output out-of-band (OOB) messages and downstream channel descriptor (DCD) messages over a cable network. The OOB messages are preferably outputted over one or more one-way data tunnels, each data tunnel being identified with a network address. The DCD messages are preferably outputted over downstream channels and identify at least a portion of the network addresses associated with the tunnels provided by the CMTS.

The CPE preferably includes an embedded settop box (eSTB), an embedded cable modem (eCM), and optionally, a conditional access (CA) unit, which can be integrated with the eSTB and/or a separate feature, such as a CableCard or SmartCard. The eCM preferably scans the downstream channels for the CMTS to locate a channel having a DCD message. It interrogates the DCD message channel to determine the DCD message identifier included therewith. The DCD message identifier is then compared to a CPE identifier to determine if they match. If the DCD message identifier matches the CPE identifier it is a matching DCD message and the tunnels identified by the network address therewith are tuned to by the eCM and the data streams associated therewith are transferred to the eSTB.

In accordance with one aspect of the present invention, the determination of whether the DCD message includes a matching identifier is performed by the eCM based on the CPE identifier being outputted thereto by the eSTB or the CA unit. In accordance with one aspect of the present invention, the determination as to whether the DCD message includes a matching identifier is performed by the eSTB based on the CPE identifier being embedded therein or outputted thereto by the CA unit, in which case the eCM outputs the DCD message identifier to the eSTB for the comparison. In accordance with another aspect of the present invention, the determination of whether the DCD message includes a matching identifier is performed by the CA unit based on the CPE identifier being embedded therein or outputted thereto by the eSTB, in which case the eCM outputs the DCD message identifier directly to the CA unit or to the CA unit by way of the eSTB for the comparison.

In accordance with one aspect of the present invention, the eCM remains tuned to the tunnels identified in the matched DCD message if an interrupt occurs in the data tunnels. Preferably, the eCM remains tuned to the tunnels as long as the matched DCD message is being received by the eCM. If the matched DCD message is lost and/or if the DCD message is changed such that it no longer includes a matching DCD identifier, the eCM begins re-scanning the downstream channels to locate another matching DCD message.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
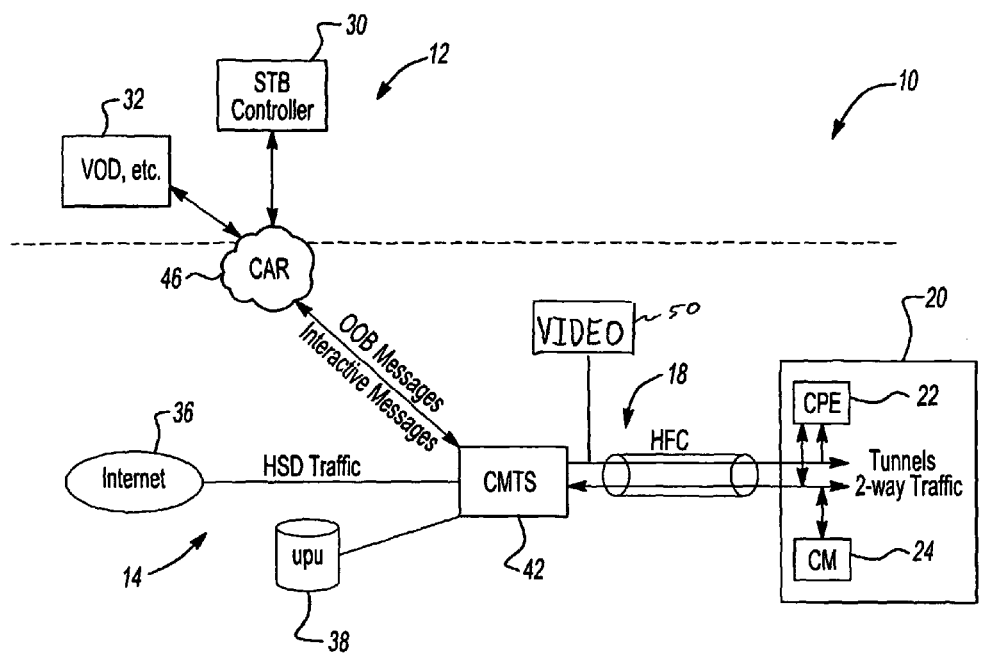
FIG. 1 illustrates a cable system in accordance with one aspect of the present invention.

FIG. 1 illustrates a cable system 10 in accordance with one aspect of the present invention. The system 10 includes a management network 12 and a High Speed Data (HSD) network 14 that respectively provide management and HSD services over a hybrid fiber coax (HFC) 18, or other communication medium, to a subscriber station 20, which includes Customer Premises Equipment (CPE) 22 and a cable modem (CM) 24.

The management network 12 generally comprises two portions, a control portion 30 and an application portion 32. The control portion 30 includes a settop box (STB) controller to control, provision, manage, and secure the CPE 22 through out-of-band (OOB) messaging. The application portion 32 provides applications to the CPE 22, such as video on demand (VOD), interactive television (iTV), and other services.

The HSD network 14 provides data services for the system 10, including services for the CM 24 to access the Internet 36. It includes a network provisioning unit (NPU) 38 having capabilities for Dynamic Host Configuration Protocol (DHCP), Trivial File Transfer Protocol (TFTP), and the like, in addition to a Domain Name System (DNS) server.

The system 10 includes a cable modem termination system (CMTS) 42 to send and receive signals to and from the CPE 22 and the CM 24 over the HFC 18. In general, the CMTS 42 transfers IP packets from the HSD network 14 and the management network 12 to the CPE 22 and CM 24 for processing. Preferably, the signals are outputted from the CMTS 42 on downstream output channels, which preferably include one-way output data tunnels, such as for OOB messaging. In addition, the CMTS 42 is configured to receive signals from the CPE 22 and the CM 24 to support two-way communication therewith, such as for transfer of IP packets from the CPE 22 and/or the CM 24 to the Internet 36 and/or the VOD or STB controller portions 32 and 30.

The system 10 includes a conditional access router (CAR) 46 to connect the management network 12 to the CMTS 42. The CAR 46 transports signals therebetween using IP protocols and provides firewall separation for the VOD or STB controller portions 32 and 30 from the HSD network 14, enhancing security from any devices attempting to associate with devices and signaling on the management network 12. In operation, signaling traffic transported between the management network 12 and the CMTS 42 may be wrapped into addressable packets, such as Ethernet, IP, or other packets.

The system 10 includes a video unit 50 for delivering video signals to the subscriber station 20 over the HFC 18. The video unit 50 can deliver any number of video signals, including network television, cable television, pay-per-view, video on demand, and the like.

Figure 2:
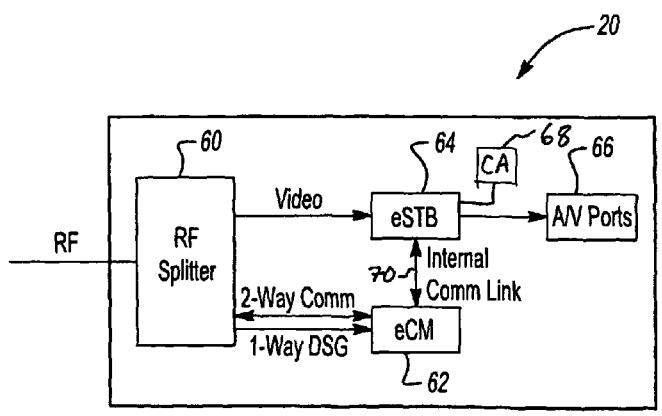
FIG. 2 illustrates Customer Premises Equipment (CPE) in accordance with one aspect of the present invention.

FIG. 2 illustrates the CPE 22 in accordance with one aspect of the present invention. The CPE 22 is preferably configured to communicate with the CMTS 42 through digital cable signals, such as through signaling defined by the Data Over Cable Service Interface Specification (DOCSIS) and/or through other protocols authorized through DHCP registration.

The CPE 22 includes a radio frequency (RF) splitter 60, an embedded cable modem (eCM) 62, an embedded set-top box (eSTB) 64, an audio visual (A/V) port 66, and an optional conditional access (CA) unit 68. The RF splitter 60 splits the RF signal into two portions—one for OOB control functions and two-way application traffic and one for video delivery. The OOB and two-way application traffic is relayed to the eCM 62 and the video is relayed to the eSTB 64.

The eSTB 64 outputs video and other media signals to a media output device (not shown) or other device connected to the A/V port 66, such as to a television (TV), digital video recorder (DVR), personal video recorder (PVR), or the like.

The eCM 62 processes control and other non-media signals, such as DOCSIS and other IP packets, and bridges or relays the signals to the eSTB 64 through an internal communications link 70.

In particular, the communication link 70 is used to transfer data on tunnels tuned to by the eCM 62 to the eSTB 64 so that OOB messaging signals can be delivered to the eSTB 64 for processing.

The CA unit 68 provides conditional access control for the subscriber station 20. It can be a CableCard, SmartCard, or other item for controlling security and access to the data, video, and control signals transmitted over the HFC 18. It is illustrated as a standalone item, however, it can be included with or embedded on the eSTB 64 or the eCM 62 to perform similar functions.

The eCM 62, eSTB 64, and CA unit 68 are logically separate entities, however, they may physically share hardware and software. Other items, such as control logic and applications may be included on the CPE 22 for controlling operation of the eSTB 64 and/or the eCM 62.

Figure 3:
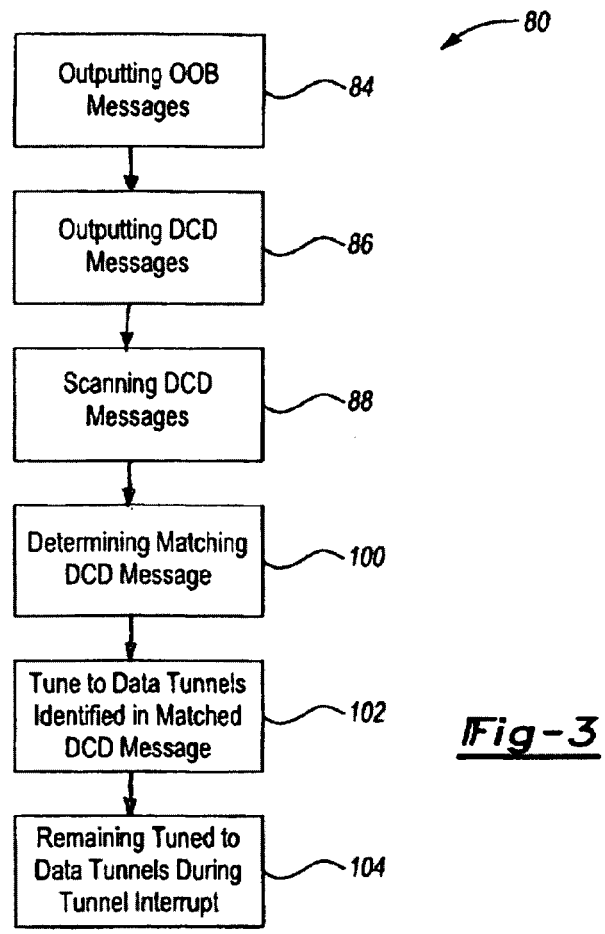
FIG. 3 illustrates a flowchart of a method for Out-Of-Band (OOB) messaging in accordance with one aspect of the present invention.
Figure 4:
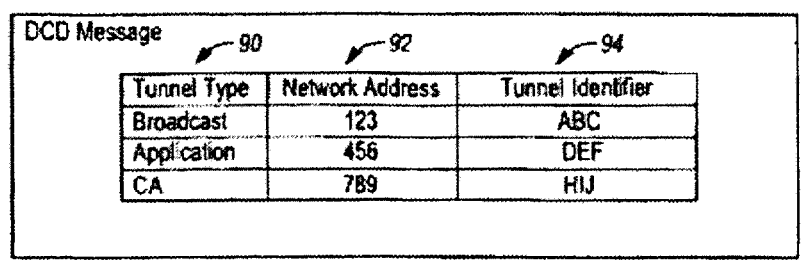

FIG. 3 illustrates a flowchart 80 of a method for OOB messaging in accordance with one aspect of the present invention.

Block 84 relates to outputting OOB messages from the CMTS 42 to one or more CPEs 22 connected to the HFC 18. In particular, the OOB messages are output over one-way data tunnels (not shown) of the CMTS 42. Each tunnel is associated with a network address 92 (see FIG. 4), such as a media access control (MAC) address so that the CPE 22, and in particular, the eCM 62 can tune to desired tunnels based on the MAC addresses.

Block 86 relates to outputting DCD messages 88 (see FIG. 4) from the CMTS 42 to one or more CPEs 20 connected to the HFC 18. In particular, the DCD messages 88 are outputted over downstream channels of the CMTS 42. Each DCD message 88 is outputted on separate channels and identifies at least a portion of the network address 92 associated with the data tunnels.

Figure 4:
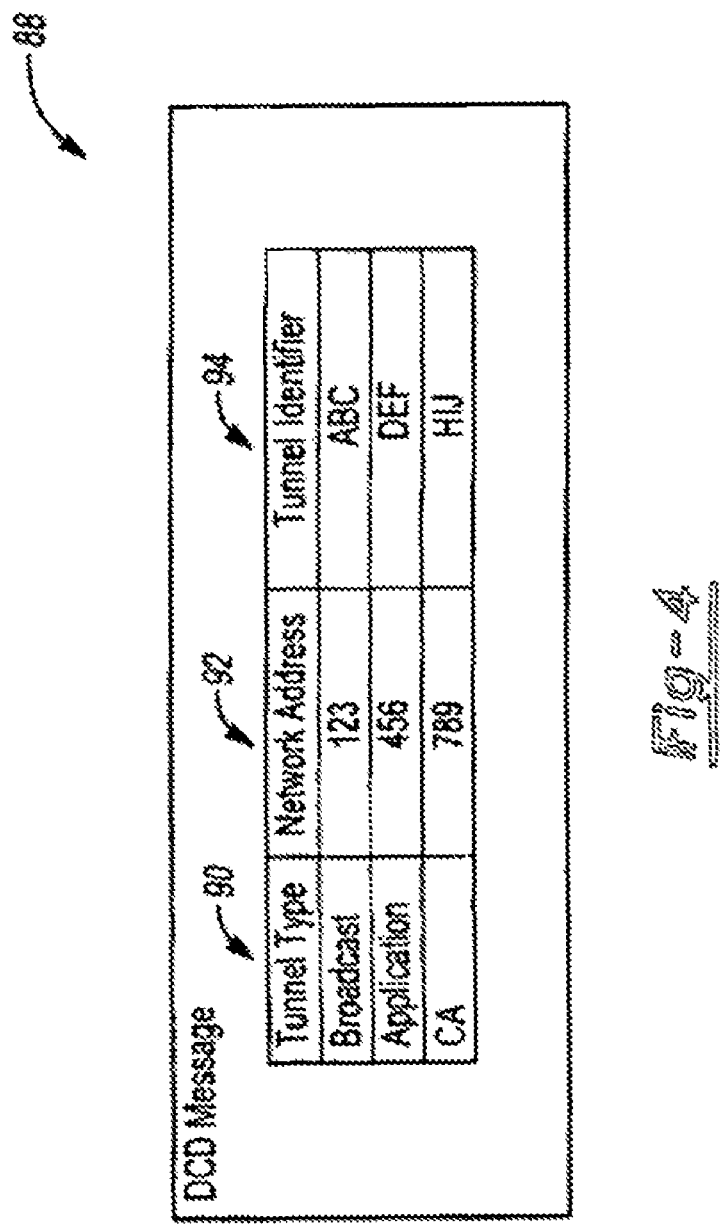
FIG. 4 illustrates a diagram of a Downstream Channel Descriptor (DCD) message in accordance with one aspect of the present invention.
Figure 1:
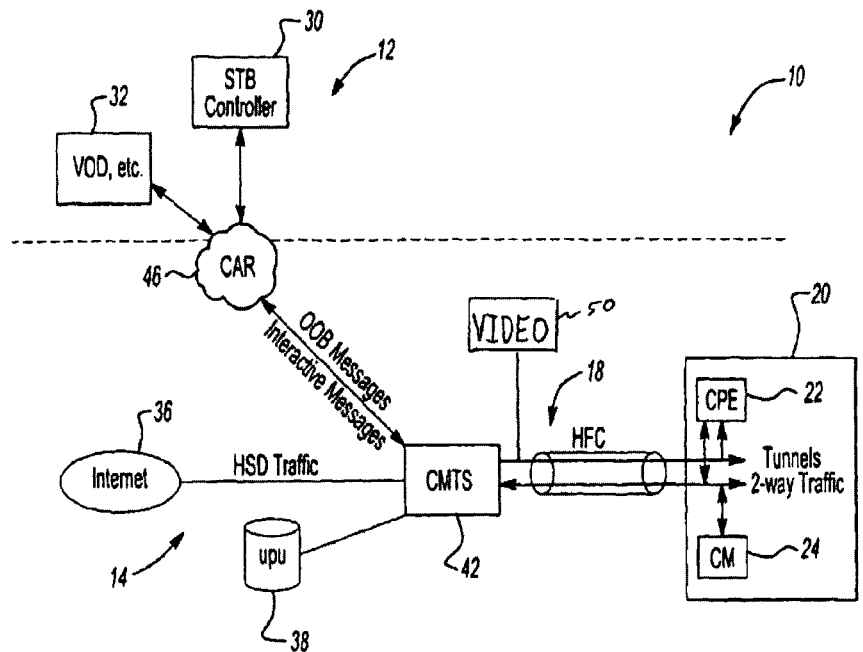
Figure 2:
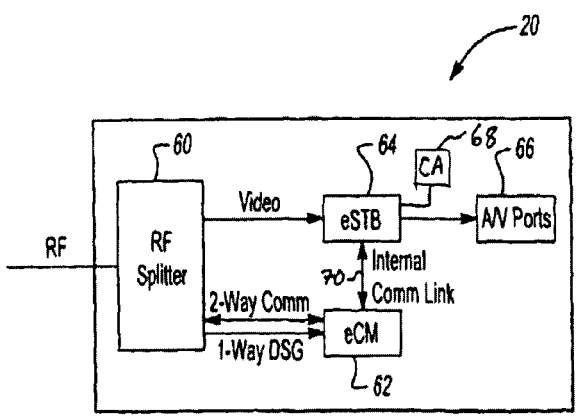

FIG. 4 illustrates a diagram of the DCD message 88 in accordance with one aspect of the present invention. The illustrated DCD message 88 is in a table format, however, the message may have any form. It includes a tunnel type column 90, a network address column 92, and a tunnel identifier column 94. The tunnel type column 90 identifies the tunnel types of the tunnels identified in the DCD message 88. The network address 92 associated with the tunnel types 90 are shown in the network address column 92. Tunnel identifiers 94 associated with the network address are shown in the tunnel identifier column 94. The tunnel identifiers 94 are unique identifiers associated with each tunnel type 90. The tunnel types are common identifiers, i.e. broadcast, conditional access, application, etc., such that the same DCD message 88 or different DCD message 88 may include the same tunnel type.

In contrast, the tunnel identifier 94 is a unique identifier for each tunnel, regardless of the tunnel type 90 assigned to the tunnel, such that the tunnel identifier 94 may be used to differentiate between different tunnels identified with the same tunnel type 90. For example, the CMTS 42 may be required to support CPEs 22 of different vendors such that each vendor requires a particular set of conditional access signals. In this case, the conditional access signals are provided through different conditional access tunnels, whereby each conditional access tunnel is identifiable by the tunnel identifier 94 associated therewith. In this manner, multiple conditional access tunnels can be used within the system 10 and assigned to different CA units 68 based on the unique tunnel identifier 94, which is preferably referred to as its conditional access identification.

Returning to FIG. 2, block 98 relates to scanning downstream channels of the CMTS 42 for DCD messages 88. Multiple channels are analyzed to determine whether they include a DCD message 88. In some case, the scanning of the channels may include scanning video channels, DOCSIS channels, and non-DOCSIS channels. Preferably, the DCD message 88 is included on a DOCSIS management layer channel such that all non-DOCSIS channels are discarded so scanning may continue.

Block 100 relates to interrogating the DCD messages 88 to determine if a DCD message identifier included therewith matches a CPE identifier. This can be done with the eCM 62, the eSTB 64, and/or the CA unit 68. The DCD message identifier is preferably any identifier that can be used to reference the DCD message 88, including one of the values included in the DCD message 88, such as the tunnel identifiers. The CPE 22 identifier is an identifier embedded or programmed into the eSTB 64, the eCM 62, and/or the CA unit 68. The system. 10 may include CPEs 22 manufactured by any number of vendors, and the CPE identifier is preferably associated with the vendor. Preferably, the CPE identifier is the tunnel identifier 94 of the conditional access tunnel supported by the vendor. This is advantageous because the eSTB 64 can only operate if it receives instructions through the conditional access tunnel that corresponds with its vendor configuration.

Block 102 relates to tuning to the tunnels identified in the DCD message 88. In particular, the tuning is performed by the eCM 62 accepting data streams based on the network address 92 in the DCD message 88 and delivering the data stream to the eSTB 64. The eCM 62 can automatically tune to tunnels based on the matching DCD message 88 and/or it can be instructed by the eSTB 64 or the CA unit 68, depending on the item interrogating the DCD message 88 in block 100.

Block 104 relates to remaining tuned to the tunnels of block 102 during tunnel interrupts. Tunnel interrupts cover any interrupt in the supply of data through the tunnels, such as temporary power losses or shorts, maintenance interrupts, and the like. Preferably, the eCM 62 stays tuned to the tunnels as long as the DCD message identifying the tunnels is being received. If the DCD message 88 is lost, then the eCM 64 begins searching for another DCD message 88, which is common if it is desirable to change the tunnels tuned to by the eCM 62, wherein the DCD message 88 is simply retracted and a new DCD message 88 with new network addresses 92 for the tunnels is outputted.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

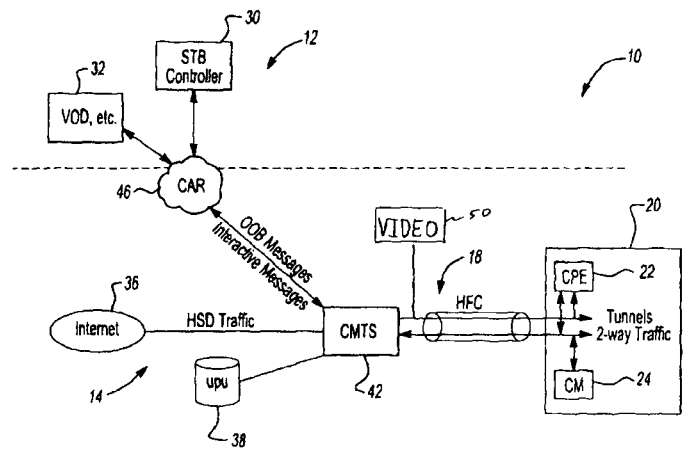

What is claimed is:

1. An apparatus comprising:
   a device configured to output a customer premises equipment (CPE) identifier; and
   a modem in communication with the device, the modem configured to receive the CPE identifier and configured to scan downstream channels for a matching channel information message, the matching channel information message having a channel information message identifier that matches the CPE identifier, the modem further configured to tune to one or more tunnels identified in the matching channel information message and deliver out-of-band (OOB) messages included in the tuned-to tunnels to the device,
   wherein the out-of-band (OOB) messages and the channel information messages are transmitted over a network, wherein the OOB messages are output over the one or more tunnels where each tunnel is identified with a network address, and each channel information message is output over the downstream channels,
   wherein each channel information message identifies at least a portion of the network addresses associated with the one or more tunnels and includes a listing of tunnel types and a listing of tunnel identifiers for differentiating between different tunnels identified with a same tunnel type but associated with different types of CPE.

2. The apparatus of claim 1 wherein the network addresses are media access control (MAC) addresses.

3. The apparatus of claim 1, wherein each channel information message comprises a downstream channel descriptor (DCD) message and each channel information message identifier comprises a downstream channel descriptor (DCD) message identifier.

4. The apparatus of claim 3 wherein the device remains tuned to the one or more tunnels identified in the matching DCD message if an interrupt occurs to the tuned-to tunnels.

5. The apparatus of claim 4 wherein the device remains tuned to the one or more tunnels identified in the matching DCD message as long as the matching DCD message is being received by the modem.

6. The apparatus of claim 3 wherein the CPE identifier is a tunnel identifier associated with one of the network addresses in the DCD message.

7. The apparatus of claim 6 wherein the tunnel identifier is a conditional access tunnel identifier.

8. A system for Out-Of-Band (OOB) messaging, the system comprising:
   an information distribution system, the information distribution system configured to output OOB messages and channel information messages over a network, the OOB messages being outputted over one or more one-way data tunnels where each data tunnel is identified with a network address, each channel information message being outputted over downstream channels and identifying at least a portion of the network addresses associated with the tunnels provided by the information distribution system, each channel information message also including a listing of tunnel types and a listing of tunnel identifiers for differentiating between different tunnels identified with a same tunnel type but associated with different types of customer premises equipment (CPE); and
   the Customer Premises Equipment (CPE) having a device configured to output a CPE identifier and a modem in communication with the device, the modem receiving the CPE identifier and configured to scan the downstream channels of the information distribution system for a matching channel information message, the matching channel information message having a channel information message identifier that matches the CPE identifier, the modem tuning to the tunnels specified in the matching channel information message and delivering the OOB messages included in the tuned-to tunnels to the device.

9. The system of claim 8 wherein the network addresses are media access control (MAC) addresses.

10. The system of claim 8, wherein each channel information message comprises a downstream channel descriptor (DCD) message and each channel information message identifier comprises a downstream channel descriptor (DCD) message identifier.

11. The system of claim 10 wherein the device remains tuned to the tunnels identified in the matching DCD message if an interrupt occurs to the tuned-to tunnels.

12. The system of claim 11 wherein the device remains tuned to the tunnels identified in the matching DCD message as long as the matching DCD message is being received by the modem.

13. The system of claim 10 wherein the CPE identifier is a tunnel identifier associated with one of the network addresses in the DCD message.

14. The system of claim 13 wherein the tunnel identifier is a conditional access tunnel identifier.

15. The system of claim 14 wherein the conditional access tunnel identifier is associated with a conditional access identification of a vendor of the CPE.

16. A method comprising:
   receiving out-of-band (OOB) messages and channel information messages, the OOB messages being outputted over one or more one-way data tunnels where each data tunnel is identified with a network address, the channel information messages being outputted over downstream channels and each including at least a portion of the network addresses associated with the tunnels provided by a information distribution system, each channel information message also including a listing of tunnel types and a listing of tunnel identifiers for differentiating between different tunnels identified with a same tunnel type but associated with different types of customer premises equipment (CPE);

scanning the downstream channels of the information distribution system with a modem for the channel information messages;

determining if one of the scanned channels includes a matching channel information message, the matching channel information message having a channel information message identifier that matches a customer premises equipment (CPE) identifier; and controlling the modem to tune to the tunnels specified in the matching channel information message and to deliver the OOB messages included in the tuned-to tunnels to a device.

17. The method of claim 16 further comprising associating the network addresses with media access control (MAC) addresses.

18. The method of claim 16, wherein each channel information message comprises a downstream channel descriptor (DCD) message and each channel information message identifier comprises a downstream channel descriptor (DCD) message identifier.

19. The method of claim 18 further comprising remaining tuned to the tunnels identified in the matching DCD message if an interrupt occurs to the tuned-to tunnels.

20. The method of claim 18 further comprising remaining tuned to the tunnels identified in the matching DCD message as long as the matching DCD message is being received by the modem.

21. The method of claim 18 further comprising outputting the CPE identifier from the device to the modem such that the modem determines whether the scanned channels include the matching DCD message.

22. The method of claim 18 further comprising outputting the CPE identifier from a conditional access unit of the CPE to the modem such that the modem determines whether the scanned channels include the matching DCD message.

23. The method of claim 18 wherein determining whether the scanned channels include the matching DCD message includes outputting the DCD message identifier included in the DCD messages of the scanned channels to the device such that the device determines whether the DCD message identifier matches the CPE identifier.

24. The method of claim 18 wherein determining whether the scanned channels include the matching DCD message includes outputting the DCD message identifier included in the DCD messages of the scanned channels to a conditional access unit of the CPE such that the conditional access unit determines whether the DCD message identifier matches the CPE identifier.

25. The method of claim 18 further comprising associating the CPE identifier with a tunnel identifier of one of the network addresses in the DCD message.

26. The method of claim 25 further comprising associating the tunnel identifier with a conditional access tunnel identifier.

27. The method of claim 26 further comprising associating the conditional access tunnel identifier with a conditional access identification of a vendor of the CPE.

28. An apparatus comprising:
a modem configured to scan downstream channels of an information distribution system for channel information messages and to output a channel information message identifier included in the channel information messages; and a device configured to instruct the modem to continue scanning of the channel information messages if the channel information message identifier fails to match a customer premises equipment (CPE) identifier and to tune to one or more tunnels identified by a network address in the channel information messages if the channel information message identifier matches with the CPE identifier, wherein a conditional access unit coupled to the device is configured to determine whether the channel information message identifier matches with the CPE identifier, wherein the information distribution system is configured to output out-of-band (OOB) messages and the channel information messages over a network, wherein the OOB messages are output over the one or more tunnels where each tunnel is identified with the network address, and each channel information message is output over the downstream channels, and wherein each channel information message identifies at least a portion of the network addresses associated with the one or more tunnels provided by the information distribution system and includes a listing of tunnel types and a listing of tunnel identifiers for differentiating between different tunnels identified with a same tunnel type but associated with different types of customer premises equipment (CPE).

29. The apparatus of claim 28, wherein the device comprises a set top box.

30. The apparatus of claim 28, wherein the modem comprises a cable modem.

31. The apparatus of claim 28, wherein the information distribution system comprises a cable modem termination system.

32. The apparatus of claim 28, wherein each channel information message comprises a downstream channel descriptor (DCD) message and each channel information message identifier comprises a downstream channel descriptor (DCD) message identifier.

* * * * *

UNITED STATES PATENT AND TRADEMARK OFFICE
CERTIFICATE OF CORRECTION

PATENT NO.        : 8,320,376 B2
APPLICATION NO.   : 10/570831
DATED             : November 27, 2012
INVENTOR(S)       : Kevin N. Taylor It is certified that error appears in the above-identified patent and that said Letters Patent is hereby corrected as shown below:

Delete the title page and substitute the attached title page therefor.

In the Drawings

Delete Drawing Sheets 1-3 and substitute therefore with the attached Drawing Sheets 1-2 consisting of FIGS. 1-4.

Signed and Sealed this
Fifteenth Day of October, 2013

Teresa Stanek Rea
*Deputy Director of the United States Patent and Trademark Office*

(12) United States Patent
Taylor et al.

(10) Patent No.: US 8,320,376 B2
(45) Date of Patent: Nov. 27, 2012

(54) METHOD AND SYSTEM FOR OUT-OF-BAND MESSAGING

(75) Inventors: Kevin N. Taylor, Parker, CO (US); Doug Jones, Boulder, CO (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 771 days.

(21) Appl. No.: 10/570,831

(22) PCT Filed: Sep. 7, 2004

(86) PCT No.: PCT/US2004/028908
§ 371 (c)(1),
(2), (4) Date: Feb. 5, 2007

(87) PCT Pub. No.: WO2005/025114
PCT Pub. Date: Mar. 17, 2005

(65) Prior Publication Data
US 2007/0274345 A1 Nov. 29, 2007

Related U.S. Application Data

(60) Provisional application No. 60/501,231, filed on Sep. 5, 2003.

(51) Int. Cl.
*H04L 12/56* (2006.01)
(52) U.S. Cl. .................................................. 370/392
(58) Field of Classification Search .............. None
See application file for complete search history.

(56) References Cited

U.S. PATENT DOCUMENTS

| | | |
|---|---|---|
| 5,745,837 A | 4/1998 | Fuhrmann |
| 6,674,749 B1 | 1/2004 | Mattathil |
| 6,853,680 B1 | 2/2005 | Nikolich |
| 6,952,836 B1 | 10/2005 | Donlan et al. |
| 6,988,130 B2 | 1/2006 | Blumenau et al. |
| 7,194,756 B2 | 3/2007 | Addington |
| 7,287,257 B2 | 10/2007 | Meza |
| 7,324,515 B1 * | 1/2008 | Chapman ............... 370/392 |
| 7,349,430 B1 * | 3/2008 | Chapman ............... 370/468 |
| 7,359,434 B2 * | 4/2008 | Shahar et al. ........... 375/222 |
| 2001/0033585 A1 | 10/2001 | Lazarus et al. |
| 2002/0001316 A1 | 1/2002 | Hornsby et al. |
| 2002/0012353 A1 | 1/2002 | Gerszberg et al. |
| 2002/0019984 A1 | 2/2002 | Rakib |
| 2002/0067725 A1 | 6/2002 | Oguchi et al. |
| 2002/0071440 A1 | 6/2002 | Cerami |
| 2002/0143565 A1 | 10/2002 | Headings |
| 2002/0191635 A1 | 12/2002 | Chow et al. |

(Continued)

OTHER PUBLICATIONS

International Search Report for corresponding International Application No. PCT/US04/28908, 1 page, Aug. 26, 2005.

(Continued)

*Primary Examiner* — Yong Zhou
(74) *Attorney, Agent, or Firm* — Banner & Witcoff, Ltd.

(57) ABSTRACT

Method and system for Out-Of-Band (OOB) massaging with Customer Premises Equipment (CPE) configured to receive OOB messaging signals from a Cable Modem Termination System (CMTS). The method and system include determining whether a DCD message identifying data tunnels includes a DCD message identifier matching with a CPE identifier such that the data tunnels identified in the matching DCD message are tuned to by the CPE.

32 Claims, 2 Drawing Sheets